(12) United States Patent
Damera-Venkata

(10) Patent No.: US 7,033,090 B2
(45) Date of Patent: Apr. 25, 2006

(54) LENTICULAR-PRINTING CALIBRATION TARGETS

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 10/681,564

(22) Filed: Oct. 8, 2003

(65) Prior Publication Data
US 2005/0078163 A1    Apr. 14, 2005

(51) Int. Cl.
*B41J 5/30*    (2006.01)
*H03K 5/01*    (2006.01)

(52) U.S. Cl. .......................................... 400/62; 327/165

(58) Field of Classification Search ................. 400/62; 327/165; 367/11; 708/817; 324/76.3; 355/67, 355/53
See application file for complete search history.

(56) References Cited

U.S. PATENT DOCUMENTS 4,168,484 A * 9/1979 Wright, Jr. .................... 367/59
2003/0081229 A1* 5/2003 Underwood et al. ......... 358/1.9

* cited by examiner

*Primary Examiner*—Andrew H. Hirshfeld
*Assistant Examiner*—Wasseem H. Hamdan

(57) ABSTRACT

Calibration targets are generated for lenticular printing. A method involves generating a square wave at a frequency determined by a target pitch for the lenticules. Then filtering the square wave to eliminate aliased harmonics having regard to a Nyquist frequency determined by the resolution of the printer and the required calibration precision. The resulting spatial domain square wave is printed onto a lenticular sheet to produce a calibration target. The targets are used to determine the true pitch of lenticules on a lenticular sheet.

18 Claims, 5 Drawing Sheets

US 7,033,090 B2

LENTICULAR-PRINTING CALIBRATION TARGETS

FIELD OF THE PRESENT INVENTION

The present invention relates to lenticular printing, and more particular to lenticular printing calibration targets.

BACKGROUND OF THE PRESENT INVENTION

Plastic-covered, ribbed, pictures that appear to move or change scenes are familiar to most Americans. These special effects can also include a three-dimensional effect. Lenticular sheets are laminated on to flat printed image. The cylindrical lenses are arranged in parallel strips and allow only one of the interlaced images to be seen by a viewer at any one angle. But as the angle of view changes, the scene can change and give the illusion of three-dimensions, morphing, animation, and flipping.

The lenticular sheets typically include a series of optical grade cylindrical lenses, or lenticules. In use, several images can be printed underneath the lenticules. Each image is divided into strips and one strip from each image is printed underneath each lenticule. The lenticules refract the different strips so that one of the images is visible at a time according to the angle of observation. Changing the angle of observation causes different images to appear and in consequence the image appears to change.

For lenticular printing to be effective the image strips must be correctly aligned with the lenticules. Sheets of lenticular film are typically manufactured for a specified number of lines (or lens) per inch rating which can range 6–300 lines per inch (lpi). The pitch of the lenticules is the distance between lenticule centers. Generally, the pitch of the lenticule is a function of the desired viewing distance. A higher pitch is used for longer viewing distances.

Effective lenticular printing requires extremely accurate pitch calibration of the lenticules, e.g., up to $1/100^{th}$ of the lines-per-inch pitch. Due to imperfections in the manufacturing process, the actual pitch varies from the nominal value. Furthermore, it is important that the errors in the pitch of the interlaced print below the lenticules do not aggregate.

SUMMARY OF THE PRESENT INVENTION

Briefly, a method embodiment of the present invention generates lenticular-printing calibration targets. A square wave is generated at a frequency determined by a target pitch for the lenticules. The square wave is filtered to eliminate aliased harmonics related to a Nyquist frequency determined by the resolution of the printer and the required calibration precision. The resulting spatial domain square wave is printed for a lenticular sheet to produce a calibration target.

DETAILED DESCRIPTION OF THE EMBODIMENTS

Figure 1:
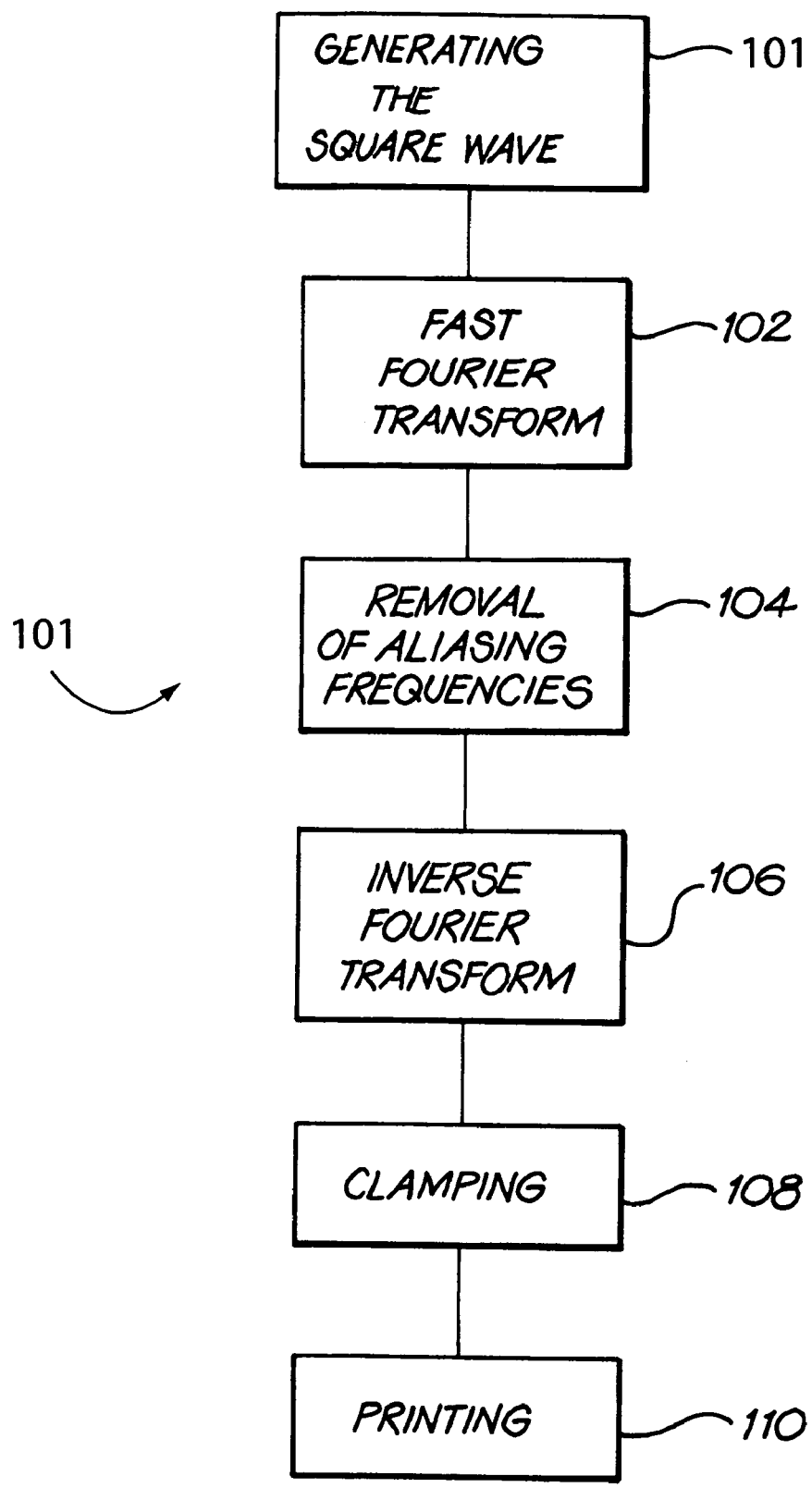
FIG. 1 is a flowchart diagram of a method embodiment of the present invention for generating lenticular-printing calibration targets.

FIG. 1 represents a method embodiment of the present invention for generating lenticular-printing calibration targets, and is referred to herein by the general reference numeral 100. For example, the nominal pitch of a lenticular sheet is specified to be 20.0 lines-per-inch, the actual product will vary. Calibration targets can be used to measure the true pitch, e.g., with calibration precision of $1/10^{th}$ of an inch.

Method 100 comprises generating a square wave in a step 101. A fast Fourier transform in a step 102 converts this to the frequency domain. A step 104 is then easily able to remove aliasing frequencies. A step 106 reconverts to the time domain with an inverse fast Fourier transform. A step 108 clamps the resulting image. And a step 110 prints the calibration targets on sheets of paper. Users thereafter measure the actual pitch of a lenticular sheet by seeing which calibration target sheet produces the maximum effect.

The software driving laser and inkjet printers can be used to scale the sizes of images output to a printer. Printer resolutions can well exceed 300 dots-per-inch (dpi). Calibration targets are printed that range 19.0–21.0 lenticular lines-per-inch, in increments of 0.1. The true pitch of a lenticular sheet can be determined by viewing the line patterns generated by each calibration target through the lenticular sheet, and observing which pattern switches best between all black and all white, over the range of viewing angles.

A typical calibration target will be for 20.5 lines-per-inch, and a typical printer resolution will be 300 dpi. A square wave generator with a 50% duty cycle, and an amplitude 1.0, is generated at a frequency dictated by a target pitch of 20.5 lines-per-inch.

Figure 2A:
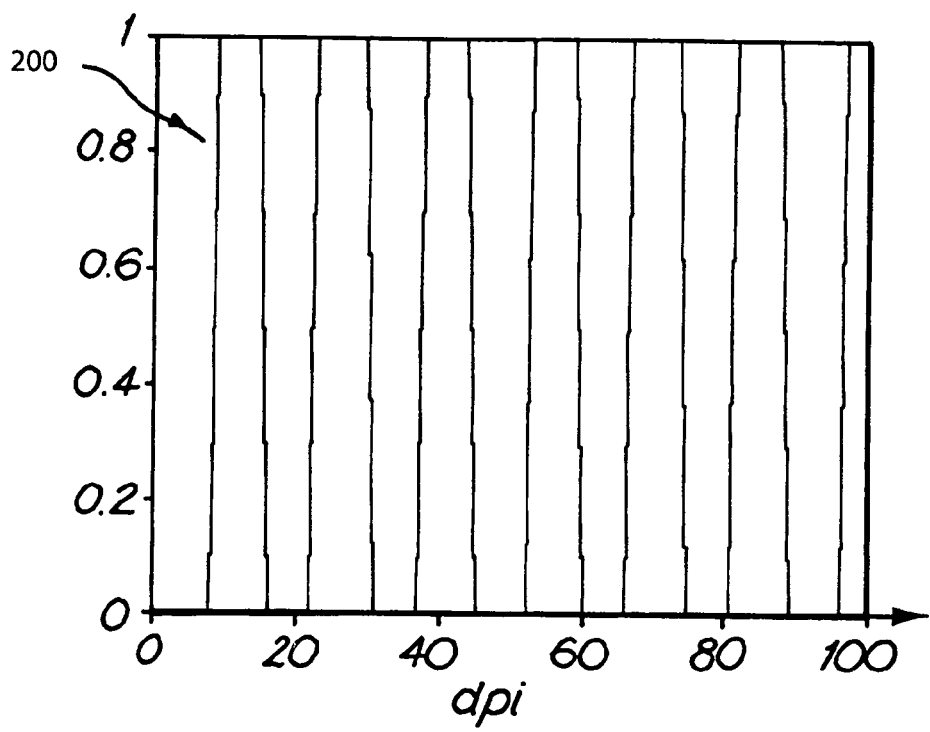
FIG. 2A is a spatial domain plot of a 50% duty cycle square wave, the vertical axis is grayscale level between white and black.
Figure 2B:
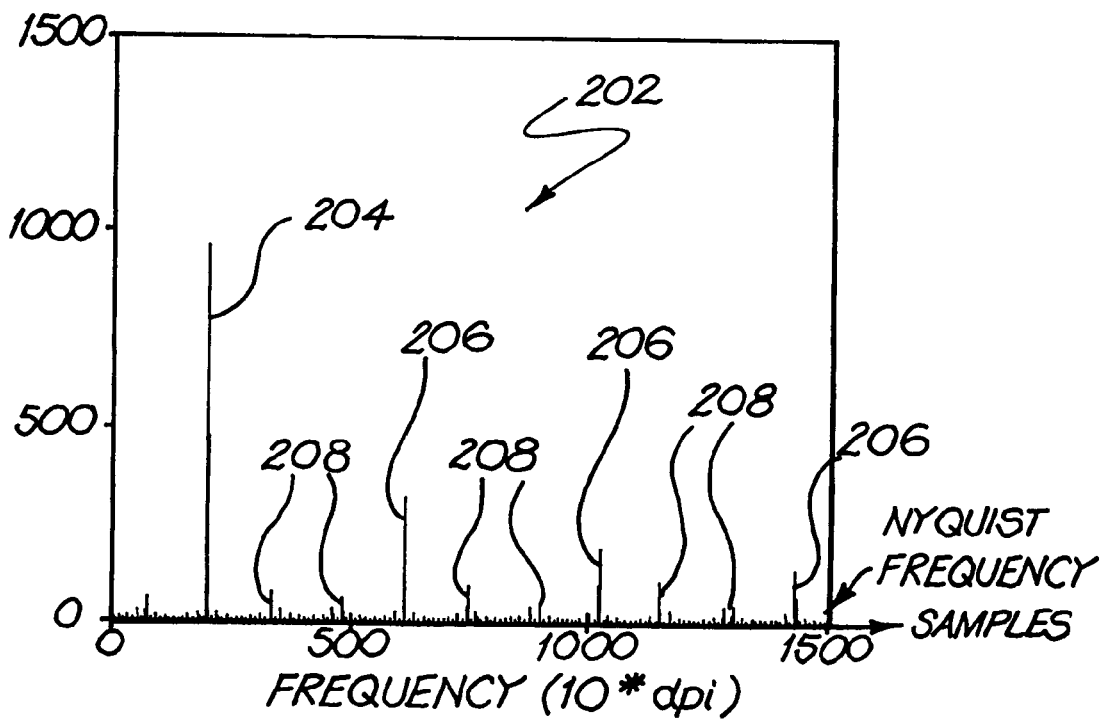
FIG. 2B is a frequency domain representation of the square wave of FIG. 2A.

A step 102 involves computing the fast Fourier transform (FFT) of the generated square wave. The number of samples is determined by the resolution of the printer and the calibration precision required, that is the product 10×300 dpi, or 3000 samples. As illustrated in FIG. 2B, the FFT 202 of this square wave produces a fundamental component peak 204 at sample 205. However it also produces odd harmonics 206 at odd multiples of the fundamental, that is at samples 615, 1025 and 1435. Aliasing 208 is also produced at neighboring frequencies.

To avoid the generation of moiré frequencies in the spatial domain, only the fundamental and the harmonics below the Nyquist frequency are required. The Nyquist frequency is the maximum frequency that is represented in the Fourier transform without aliasing. Its location occurs at half the length of the FFT used. Thus the Nyquist frequency is 150 dpi represented by the $1500^{th}$ sample of the FFT. As a result, step 104 involves zeroing out such other frequencies.

Figure 3A:
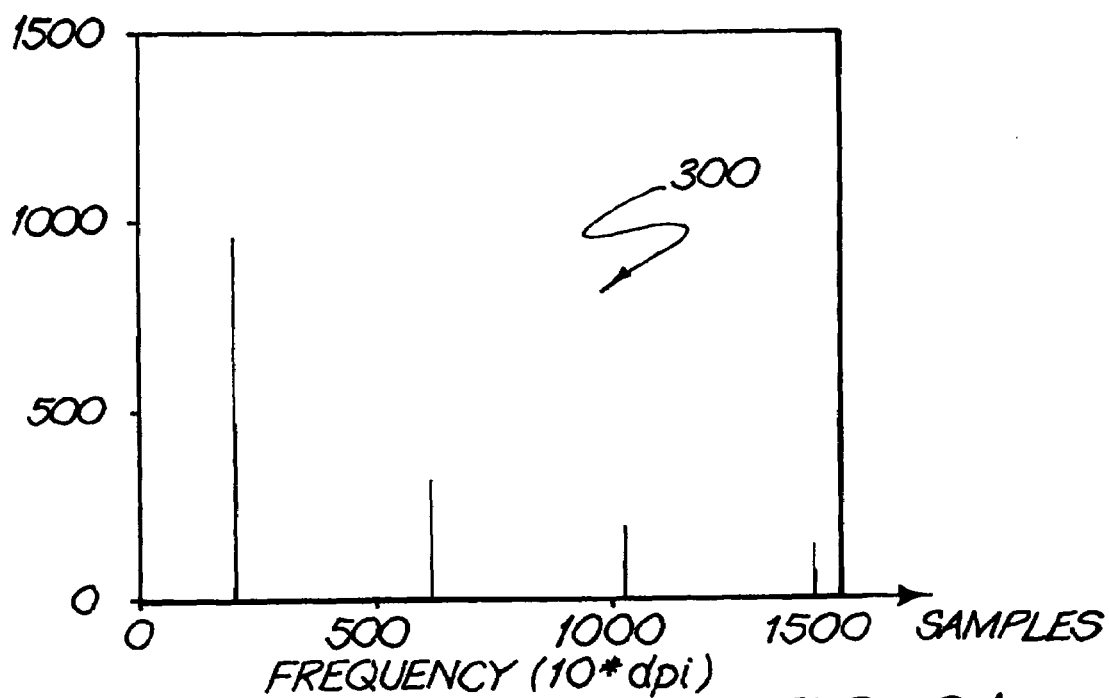
FIG. 3A is a frequency domain representation of FIG. 2B after filtering.

The result is a filtered transform which can be seen in FIG. 3A at 300. All other FFT components are due to aliased harmonics and are eliminated in this process.

The conjugate frequency is computed and retained. The FFT samples at the corresponding conjugate locations of (3000-205), (3000-615), (3000-1025) and (3000-1435) are also retained to assure that the inverse transform is real.

Figure 3B:
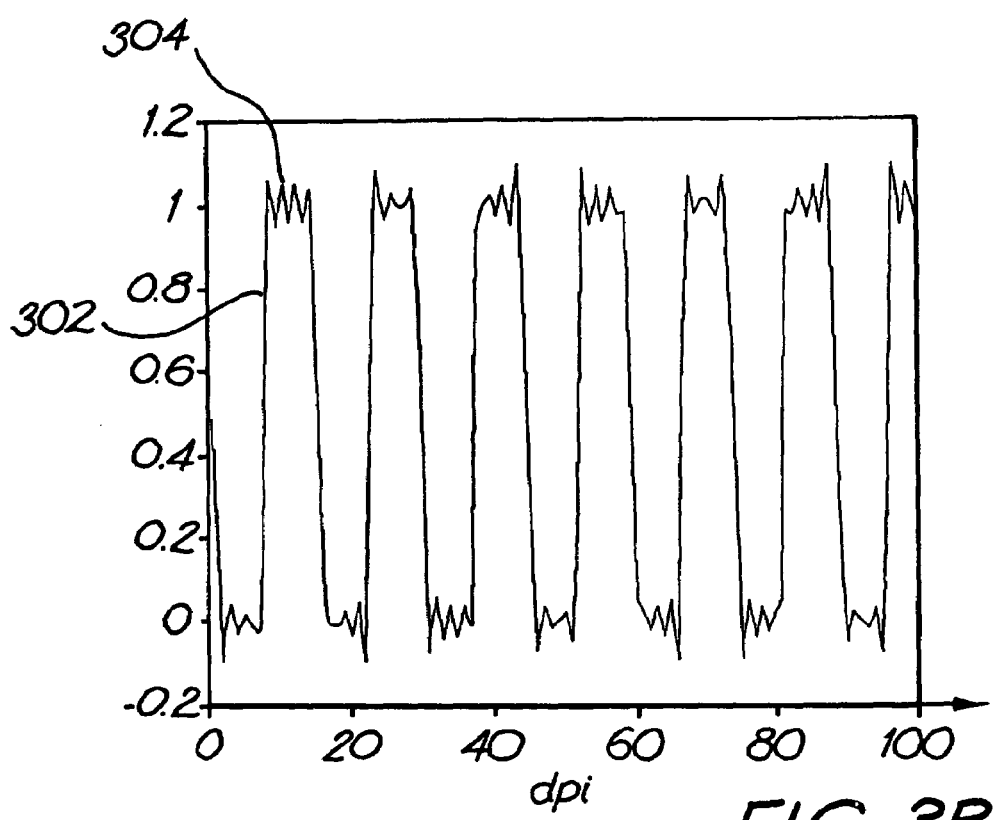
FIG. 3B is the spatial domain target plot of the waveform represented by FIG. 3A.

The inverse FFT is then computed in step 106 to reconstruct the square wave in the spatial domain, the imaginary component is discarded and the real part retained. As illustrated in FIG. 3B, this procedure results in an interpolated set of bars 302 that are close to being square waves but incorporate small oscillations 304.

Figure 4A:
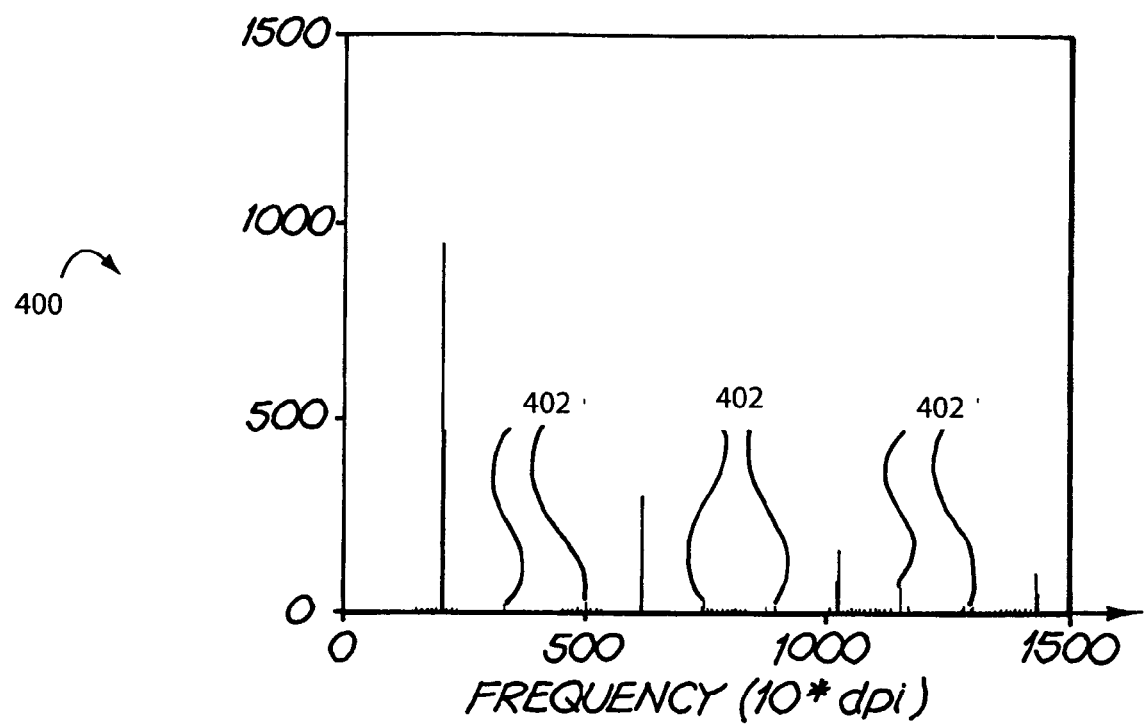
FIG. 4A is a frequency domain representation of FIG. 3B after eliminating undesirable oscillations by clamping.
Figure 4B:
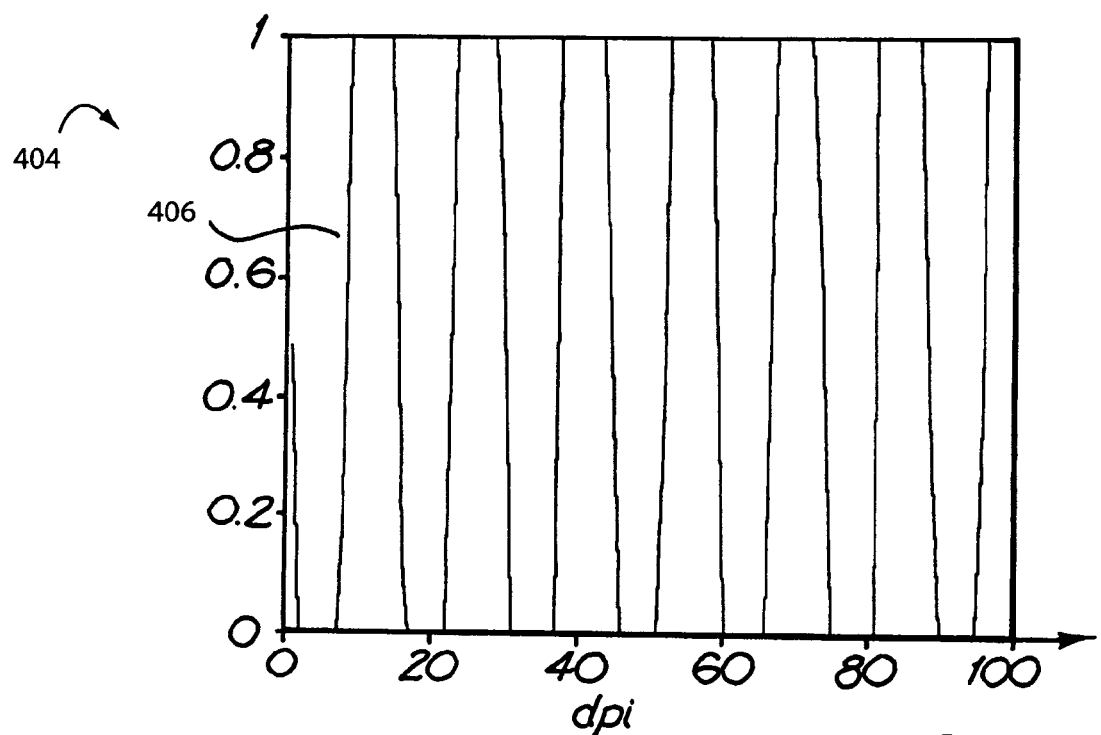
FIG. 4B is the spatial domain target plot of the final target waveform represented by FIG. 4A.

The real part of the spatial domain bars 302 is then clamped in step 108 to square it up. In the frequency domain, this reintroduces some insignificant harmonics 400 (FIG. 4A). The resulting square wave 402 in the spatial domain is seen in FIG. 4B, this is the calibration target.

The amplitude of the calibration target is then scaled up by multiplication and rounding to a desired dynamic range, for example 0–255 for an 8-bit representation. The target is then cropped to the desired print size in the sample direction. In this example if the target is to occupy 10 inches at 300 dpi, then the entire generated target which is 3000 samples long is retained.

Figure 5:
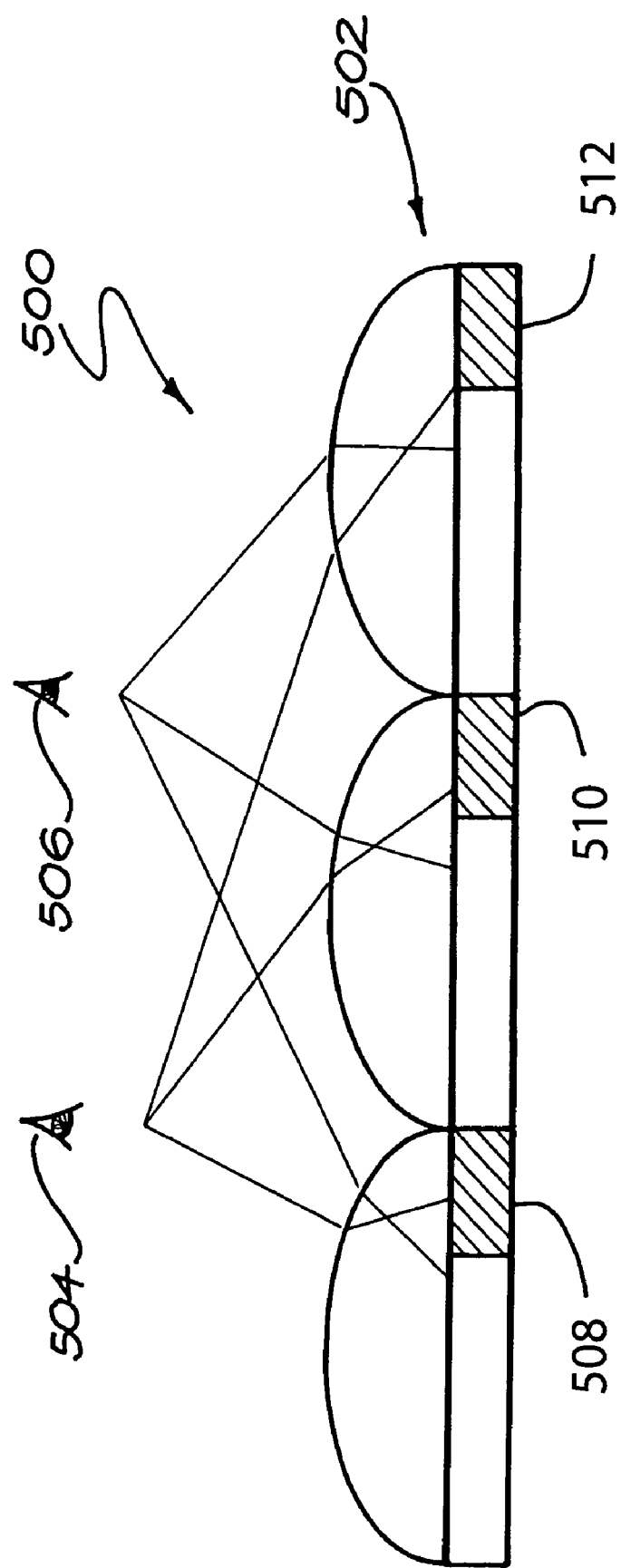
FIG. 5 is a cross section diagram of a lenticular printed image showing how a calibration target can be viewed from different angles by the right and left eyes.

FIG. 5 illustrates a lenticular printed image 500 with the calibration target 402 printed 110 to the back of a lenticular sheet 502. The target 402 is visible to the left eye 504 without optical banding artifacts, but is absent to the right eye 506. As a result accurate calibration can be seen to have been achieved, and the lenticular sheet can be seen to be produced with a pitch corresponding to 20.5 lines-per-inch. The printer can then be set up to print the image strips accordingly.

Should optical banding artifacts have appeared in the calibration target this would indicate that the lenticular sheet was not produced to the calibrated pitch of 20.5 lines-per-inch.

Referring again to FIG. 1, the following MATLAB 6.0 syntax pseudo-code is offered to show one way to implement process 100.

TABLE I

Step 101 generates a square wave,
  factor = test_lines-per-inch/dpi;
This line determines the ratio of a test pitch, in lines-per-inch, of the sheet to the resolution, in dpi, of the printer.
  n = dpi*prec;
This line determines the product of the printer resolution and precision of the calibration.
  t = [0:n-1];
This line determines the samples.
  tmp = mod(2Π*factor*t, 2Π);
This line generates a square wave of required frequency.
  $w_o$ = 2Π*0.5;
This line computes the normalized frequency for breaking up the interval (0,2Π).
  y1 = (tmp>=$w_o$);
This line assigns a value of '0' to normalized t between (0, $w_o$), '1' elsewhere so the square wave can be seen.
A step 102 is a fast Fourier transform:
  Y1=fft(y1);

TABLE II

A step 104 is the removal of aliasing frequencies by retaining only the fundamental and odd harmonics up to the Nyquist frequency:
  n_freq = n/2;
This line determines the Nyquist frequency.
  n_period = round(test_lines-per-inch*prec);
  spike = n_period;
These lines determine the location of the fundamental.

TABLE II-continued k = 0;%initialize harmonic counter
  Y=zeros(size(Y1));
  Y(1) =Y1(1);
These lines create an array of zeros
  while ((2*k+1) *spike < n_freq)
    spike_harmonic = (2*k+1) *spike;
    Y(spike_harmonic+1) =Y1(spike_harmonic+1);
    Y(n-spike_harmonic+1) =Y1(n-(spike_harmonic)+1);
    k = k + 1;
  end
These lines copy into the array the DC component, fundamental and odd harmonics up to the Nyquist frequency and their conjugate locations to remove the aliased frequencies

TABLE III

A step 106 is the inverse Fourier transform:
  yy=real(ifft(Y));

TABLE IV

A step 108 is the removal of small oscillations from the inverse transform. This is done by setting a threshold and removing oscillation from the ideal 0 and 1 amplitudes (for a square wave) by clamping oscillations within the threshold to 0 and 1 respectively:
  a=find((cal > 1) | ((cal<1) & (cal>0.9)));
  cal(a) = 1;
These lines clamp the oscillations around 1 of plus or minus 0.1 to 1
  b=find((cal < 0) | ((cal > 0) & (cal<0.1)));
  cal(b) = 0;
These lines clamp the oscillations around 0 of plus or minus 0.1 to 1.
Once this one dimensional array is generated, it may be converted to strips by replicating the array to form bars or strips.
In an alternative to step 100 the square wave is over sampled at a rate greater than the actual sampling rate (A dpi) of the system. E.g., the square wave is simply generated assuming a much greater B dpi (say M times the actual dpi).

Step 102 is dispensed with and a spatial domain filter is then designed for step 104, removing frequency components beyond A/2 dpi the Nyquist frequency of the actual system. Such a filter may be designed using conventional methods such as the Remez algorithm using software packages such as MATLAB. The Remez exchange algorithm is an iterative procedure consisting of two steps. One step is the determination of candidate filter coefficients h(n) from candidate "alternation frequencies," which involves solving a set of linear equations. The other step is the determination of candidate alternation frequencies from the candidate filter coefficients. The algorithm converges very fast, and is widely used in practice to design optimal filters.

The signal is then subsampled to the desired sampling rate by retaining every Mth sample and discarding the rest to arrive at the end of step 106.

This example performs the filtering in the spatial domain as opposed to the frequency domain.

The post processing to remove oscillations step 108 may be performed as explained for the first example.

The description of the embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. The present embodiments should be considered in all respects as illustrative and not restrictive. Accordingly, the present invention is not intended to be limited to the embodiments described above, but is to be accorded the widest scope consistent with the principles and novel features disclosed herein.

What is claimed is:

1. A computer media containing a method of generating lenticular-printing calibration targets, the method comprises the following steps:
    generating a square wave at a frequency determined by a target pitch for the lenticules;
    filtering the square wave to eliminate aliased harmonics having regard to a Nyquist frequency determined by the resolution of the printer and the required calibration precision; and,
    printing the resulting spatial domain square wave onto a lenticular sheet to produce a calibration target.

2. The method of claim 1, comprising the further step of:
    viewing the calibration target through a lenticular sheet to determine the true pitch of the sheet.

3. The method of claim 1, wherein:
    the square wave has a frequency within a target range of the nominated pitch of the lenticular sheet.

4. The method of claim 1, comprising the further step of:
    computing a Fourier transform of the generated square wave.

5. The method of claim 4, comprising the further step of:
    zeroing all frequencies other than the fundamental and odd harmonics below the Nyquist frequency.

6. The method of claim 5, comprising the further step of:
    computing an inverse Fourier transform to reconstruct the square wave in the spatial domain.

7. The method of claim 6, comprising the further step of;
    clamping the reconstructed square wave to the values 0 or 1.

8. The method of claim 7, comprising the further step of scaling the amplitude of the clamped square wave and cropping it to the desired print size in the sample direction.

9. The method of claim 1, wherein:
    the filtering step is performed in the spatial domain.

10. A computer program to control a computer to generate lenticular-printing calibration targets, the computer program being to control the computer to generate a square wave at a frequency determined by the pitch of the lenticules; and to filter the square wave to eliminate aliased harmonics having regard to a Nyquist frequency determined by the resolution of the printer and the required calibration precision.

11. The computer media program of claim 10, wherein:
    the square wave has a frequency within a target range of the nominated pitch of the lenticular sheet.

12. The computer media program of claim 10, wherein;
    the computer program computes a Fourier transform of the generated square wave.

13. The computer media of claim 12, wherein:
    the computer program zeroes all frequencies other than the fundamental and odd harmonics below the Nyquist frequency.

14. The computer media of claim 13, wherein:
    the computer program computes an inverse Fourier transform to reconstruct the square wave in the spatial domain.

15. The computer media of claim 14, wherein:
    the computer program is to control the computer to clamp the reconstructed square wave.

16. The computer media of claim 15, wherein:
    the computer program is to control the computer to scale the amplitude of the clamped square wave and crop it to the desired print size in the sample direction.

17. The program of claim 10, wherein:
    the computer program is to control the computer for the filtering step in the spatial domain.

18. A printer, comprising:
    a computer to generate a square wave at a frequency determined by the pitch of the lenticules, and to filter the square wave to eliminate aliased harmonics having regard to a Nyquist frequency determined by the resolution of the printer and the required calibration precision; and,
    a printing mechanism to print the resulting spatial domain square wave onto a lenticular sheet to produce a calibration target.

* * * * *